March 3, 1936.  A. G. F. WALLGREN  2,032,729
BEARING
Filed Feb. 26, 1934   4 Sheets-Sheet 1

INVENTOR
August Gunnar Ferdinand Wallgren
BY
ATTORNEY

March 3, 1936.   A. G. F. WALLGREN   2,032,729
BEARING
Filed Feb. 26, 1934   4 Sheets-Sheet 2
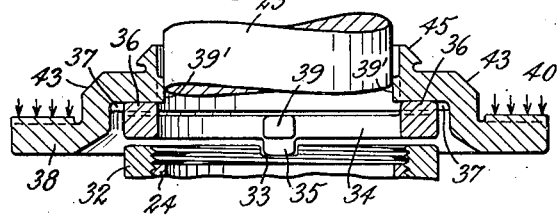
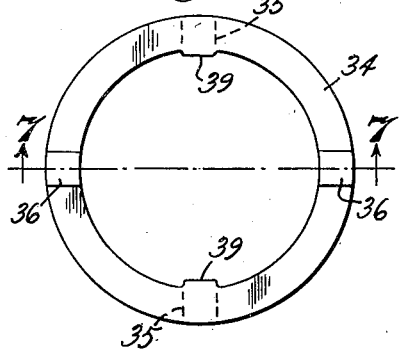
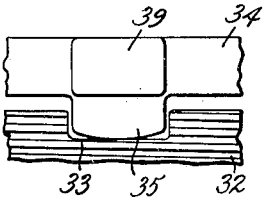
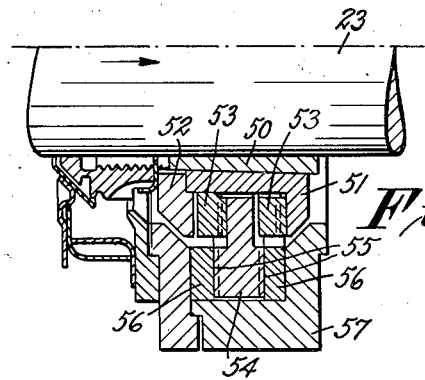
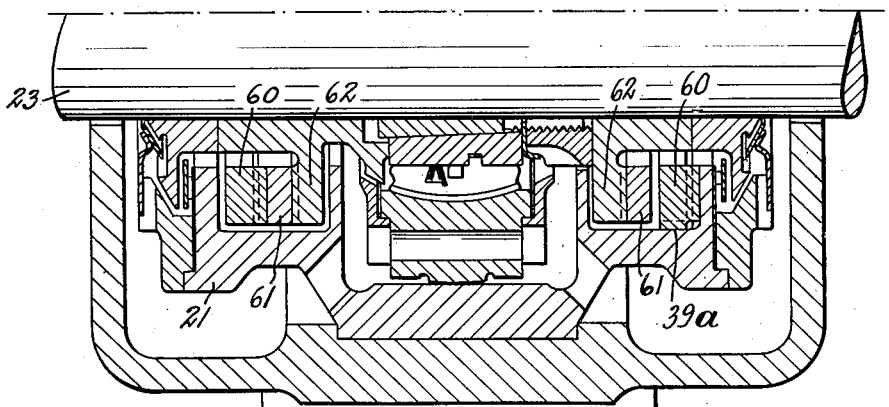
INVENTOR
August Gunnar Ferdinand Wallgren
BY
ATTORNEY

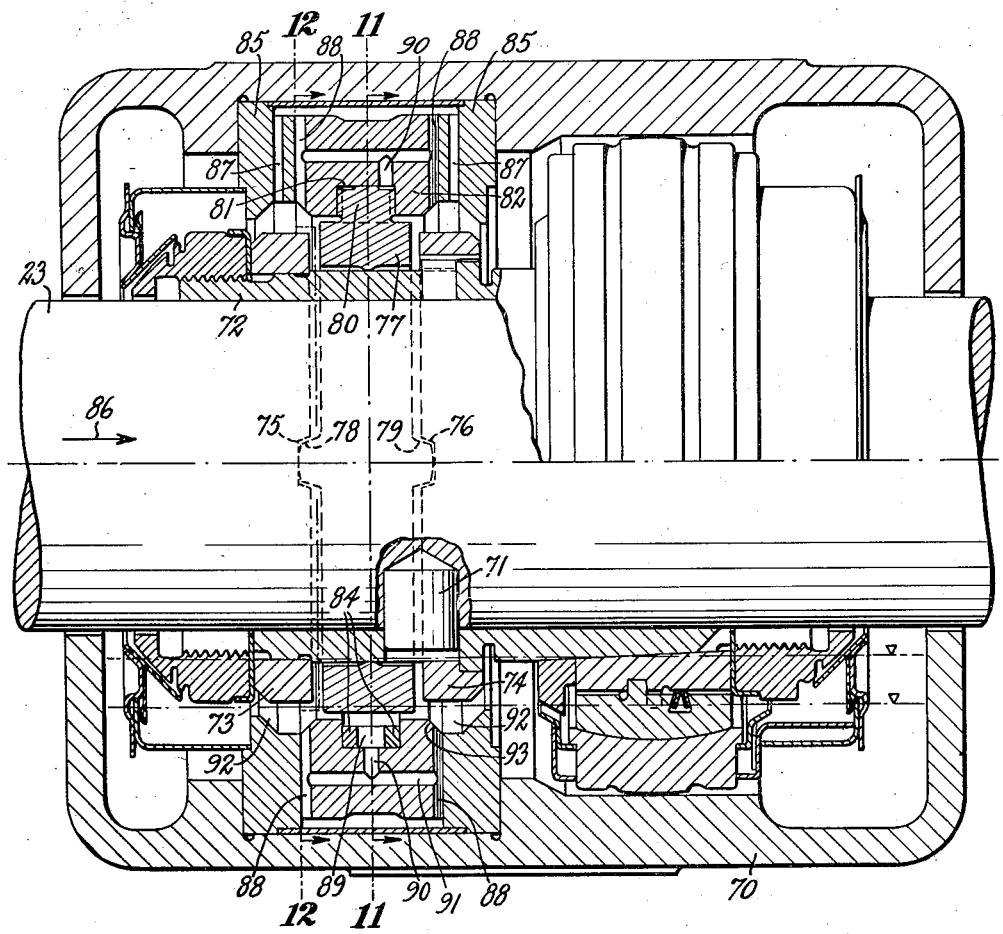

March 3, 1936. A. G. F. WALLGREN 2,032,729
BEARING
Filed Feb. 26, 1934 4 Sheets-Sheet 4
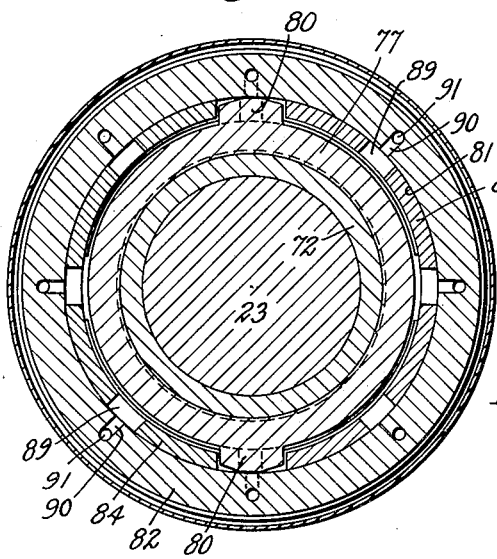
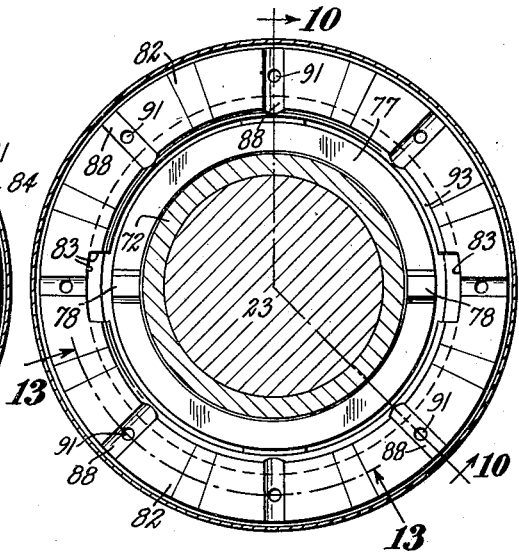
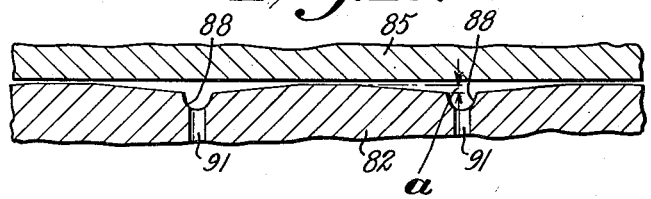
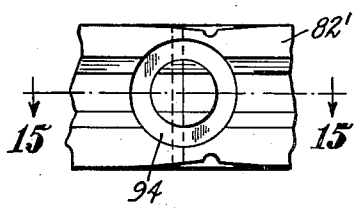
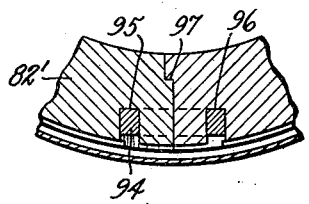
INVENTOR
August Glimmas Ferdinand Wallgren
BY
ATTORNEY Patented Mar. 3, 1936

2,032,729

UNITED STATES PATENT OFFICE 2,032,729

BEARING

August Gunnar Ferdinand Wallgren, Stockholm, Sweden, assignor to Aktiebolaget Nomy, Stockholm, Sweden, a corporation of Sweden Application February 26, 1934, Serial No. 712,967
In Sweden February 28, 1933

31 Claims. (Cl. 308—73)

My invention relates to bearings and particularly to thrust bearings, and still more particularly to thrust bearings in which one of the operative bearing surfaces is made wave-like so as to form a number of wedge shaped spaces in which load sustaining lubricant films are set up on operation of the bearing.

One of the objects of my invention is to provide a bearing of this type, either by itself or in combination with a radial bearing, which is so constructed that it may operate satisfactorily even though the shaft is bent or positioned in such manner that it is more or less oblique with respect to the fixed members of the bearing. Heretofore, thrust bearings of for instance the tiltable block type have been constructed with a ball and socket joint between the rotationally stationary bearing members and the bearing housing. This type of joint has two spherical surfaces in contact with each other and the friction between these surfaces, which surfaces must also sustain the thrust load, is very great. Consequently, with a bent shaft in which the obliquity continuously changes during rotation, there is a large frictional loss in the ball and socket joint. Moreover, the force necessary to move the joint must be transmitted through the thrust bearing surfaces, and in fact the latter cannot be moved entirely in parallelism if they are in an inclined position necessary for the maintenance of the oil films between the bearing surfaces. This has no practical influence on tiltable block bearings as their load capacity in all cases is high enough to take care of all loads coming into consideration.

A bearing with wave-like bearing surfaces has, however, due to its special character, a considerably less load capacity than a tiltable block bearing, and it is therefore advantageously applicable in cases where the thrust to be sustained is comparatively small, on account of its very simple form. Its load capacity is dependent on the correct adjustment between the bearing surfaces so that the lubricant films in the wedge shaped spaces formed by the wave-like bearing surface are of proper thickness around the whole periphery of the bearing. An inclination between the bearing surfaces, which with a ball and socket joint cannot be entirely avoided, has an adverse effect on the formation and maintenance of the lubricating oil films at the bearing surfaces.

A further object of my invention is to improve the lubrication of a bearing of the aforesaid wave-like bearing surface type.

In accordance with the preferred form of my invention the thrust bearing comprises two relatively rotatable annular members, having cooperating bearing surfaces, of which one is wave-like and the other flat, the universal movement between certain of the bearing parts which is necessary with a bent or obliquely positioned shaft being obtained by the provision of a member pivotally mounted for movement with respect to one part of the bearing about a first axis, and pivotally mounted for movement with respect to another member of the bearing about a second axis which is at right angles to said first axis. Such a member is hereinafter termed a Cardan ring or Cardan member.

In accordance with a further feature of my invention means are provided to supply oil to the wave-like bearing surfaces even when they on rotation are above the oil level in the bottom part of the bearing.

Further objects and the nature and advantages of my invention will be apparent from the following description considered in conjunction with the accompanying drawings, of which:

Fig. 1 is a cross-sectional view of a combined thrust and radial bearing embodying my invention;

Fig. 2 is a cross-sectional view of a portion of the device shown in Fig. 1 and is taken on the line 2—2 of Fig. 3;

Fig. 3 is a cross-sectional view taken on the line 3—3 of Fig. 1;

Fig. 4 is a cross-sectional view taken on the line 4—4 of Fig. 3;

Fig. 5 is a view on an enlarged scale of a portion of the device shown in Fig. 4;

Fig. 6 is an end view of one embodiment of a Cardan member;

Fig. 7 is a cross-sectional view taken on the line 7—7 of Fig. 6;

Fig. 8 is a cross-sectional view of another embodiment of my invention;

Fig. 9 is a cross-sectional view of a still further embodiment of my invention;

Fig. 10 is a cross-sectional view of a combined radial and thrust bearing in accordance with another embodiment of my invention and is taken on the line 10—10 of Fig. 12;

Fig. 11 is a cross-sectional view taken on the line 11—11 of Fig. 10;

Fig. 12 is a cross-sectional view taken on the line 12—12 of Fig. 10;

Fig. 13 is a cross-sectional view taken on an enlarged scale of a thrust bearing element;

Fig. 14 is a view on an enlarged scale of a replacement part for use in connection with the bearing shown in Figs. 10 and 12; and Fig. 15 is a cross-sectional view taken on the line 15—15 of Fig. 14.

Referring now particularly to Fig. 1, reference character 20 designates an outer bearing housing within which is rigidly secured an inner bearing housing 21. Pin 22 prevents rotation between the two housings. The housings are arranged around a rotatable shaft 23, which is to be supported with respect to both radial and thrust loads by the bearing. Secured to shaft 23 is a clamping sleeve 24 to which is secured an inner bearing ring 25. Ring 25 carries in rotation therewith a plurality of load transmitting elements or bearing blocks 26. These blocks are provided with convex spherical bearing surfaces 27, which cooperate with a concave spherical bearing surface formed in an outer bearing ring 28. Blocks 26 have slight peripheral movement with respect to inner ring 25 and are arranged so as to tilt slightly with respect thereto in order that wedge-shaped spaces may be formed between the bearing surfaces of the blocks and that of the outer ring so that wedge-shaped films of lubricant may be formed therein. A radial bearing of this type is described in full detail in U. S. Pat. No. 1,871,485 granted to me on August 16, 1932.

The aforesaid spherical bearing surfaces are all struck about a point at the center of the shaft so that the shaft and the rotatable parts of the bearing may have universal movement with respect to the outer ring 28. Consequently, the shaft may take an oblique position with respect to the outer ring without adversely affecting the operation of the bearing. The outer periphery of ring 28 may be formed with a spherical surface 29 which is supported by the interior of the inner bearing housing 21. The provision of the spherical surface 29 makes it possible for the ring 28 to roll slightly with respect to the housing in order to permit slight axial displacement of the shaft. Should such rolling not take place the spherical bearing surfaces on the blocks and on the ring would be subjected to any thrust load imposed on the shaft, whereas it is intended that such a load be taken by other bearing surfaces to be described later.

Secured to shaft 23 on one side of ring 25 is a carrying ring 30. This ring may be fixed to the shaft in any desired manner, as by the key 31. Threaded on to the opposite end of the sleeve 24 is a nut 32 which serves to clamp the sleeve on the shaft, and at the same time serves as a carrying member in the same manner as ring 30. The outside radial faces of ring 30 and nut 32 are formed with recesses 33, as shown in Figs. 4 and 5. Each member is formed with two recesses diametrically opposed. A Cardan ring 34 is provided with a pair of axially extending projections 35 diametrically opposed, which seat in the recesses 33 in the nut 32. A similar ring is provided with similar projections for seating in the recesses in ring 30. Each Cardan ring 34 is also provided with axial projections 36 on the opposite side from projections 35 and disposed at 90° with respect thereto. Projections 36 are adapted to seat in recesses 37 formed in a rotatable thrust bearing element 38. Projections 35 and 36 are somewhat longer than the depth of the respective recesses in which they seat and are somewhat narrower than the recesses. Also, the ends of the projections are rounded, as is clearly shown in Fig. 5, so that the Cardan ring may have pivotal movement with respect to both the ring 30 or the nut 32 and the bearing element 38. The pivotal movement of the Cardan ring with respect to the ring 30 or the nut 32 takes place about an axis passing through the projections 35, while the pivotal movement of the Cardan ring with respect to the bearing elements 38 takes place about an axis passing through the projections 36. It will be evident that these axles are at right angles to each other. Consequently, the bearing elements may have universal movement with respect to the carrying means 30 or 32, and hence with respect to the shaft 23. The Cardan ring 34 is further provided adjacent to projections 35 with inwardly extending radial projections 39, which contact shaft 23 and serve to center the Cardan ring with respect to the shaft, while allowing pivotal movement with respect thereto. Bearing element 38 is provided adjacent to recesses 37 with inwardly extending radial projections 39' which serve in like manner to contact the shaft and center the ring while permitting pivotal movement with respect to the shaft.

Bearing elements 38 are provided with bearing surfaces 40. These bearing surfaces are wave-shaped as is shown in exaggerated form in Fig. 13. Secured within inner housing 21 are stationary thrust bearing members 41 having flat bearing surfaces cooperating with the bearing surfaces formed on the elements 38. The wave-shaped formation of the surfaces of bearing elements 38 causes a plurality of wedge-shaped films of lubricant to be formed upon rotation of the elements which films sustain the thrust load and prevent direct metal-to-metal contact.

Inner housing 21 is preferably formed with annular walls 42 adjacent to bearing elements 38 for the purpose of maintaining an annular ring of lubricant in the neighborhood of the thrust bearing surface. The bearing elements 38 are formed with cone-shaped surfaces 43 which rotate adjacent to similar surfaces 44 on the housing 21, and, due to centrifugal force produced by the rotating elements, causes lubricant to be circulated toward the thrust bearing surfaces. Cone-shaped surfaces 45 on the elements 38 prevent lubricant from running down from the upper part of the bearing on to the shaft 23. The radial bearing is supplied with lubricant by means of a cone-shaped surface 46, which, by reason of centrifugal force, throws lubricant toward the bearing surfaces on the blocks 26 and the outer ring 28.

The operation of the above described bearing is as follows:

The weight of shaft 23 and any other radially directed force will be carried by the radial bearing comprising essentially blocks 26 and outer ring 28. If the shaft 23 is bent so that its center rotates slightly about the center of the bearing, this will not affect the operation of the radial bearing due to the fact that the outer ring 28 may have universal movement with respect to the blocks 26 and the shaft. If the shaft is subjected to a thrust load this will not be taken by the radial bearing due to the fact that the outer ring 28 may roll slightly on its spherical surfaces 29 and thus relieve any axially directed force which would otherwise be transmitted from the blocks 26 to the outer ring. Such a thrust, if acting in the direction of the arrow shown in Fig. 1, will be transmitted through the sleeve 24 and the nut 32 to the projections 35 on the Cardan ring 34. From the Cardan ring the thrust will be transmitted through the projections 36 to the thrust bearing element 38 and from here to the housing 21 through the stationary bearing element 41. Again assuming the shaft to be bent slightly, it may wobble with respect to the bearing element 38 by virtue of the fact that the Cardan ring 34 permits universal movement between the shaft and the bearing element 38. Hence, this bearing element will not wobble but will remain in contact around its entire circumference with the stationary bearing element 41. Actually, during operation, there is not metal-to-metal contact between the bearing elements inasmuch as the film of lubricant is maintained therebetween. However, bearing element 38 remains in parallelism with bearing element 41 and hence the thrust is distributed through the entire film of lubricant between the two members. Thrust acting in opposite direction will be taken by the thrust bearing element at the other end of the bearing in exactly the same manner.

In Fig. 8 there is disclosed a bearing for taking thrust load only. Mounted on shaft 23 there is a sleeve 50 to which are rigidly secured carrying members 51 and 52. Members 51 and 52 each support a Cardan ring 53 which is similar in all respects to Cardan ring 34 shown in Figs. 1 through 7, and the manner in which this ring is supported by recesses formed in members 51 and 52 is likewise the same as that shown in Figs. 1 to 7. Cardan rings 53 in turn support a single rotatable bearing element 54 by means of projections from the Cardan rings engaging recesses formed in the bearing element. The annular element 54 is provided with wave-like bearing surfaces 55 formed on opposite radial faces thereof. Ring element 54 rotates between stationary ring elements 56 which have plane bearing surfaces, and which are supported in inner housing 57. Members 56 are provided with bearing surfaces which cooperate with the bearing surfaces of rotating elements 54 to take up thrust in either direction. One of the cooperating bearing surfaces, preferably the rotating one, is wave-like whilst the other is smooth. The Cardan rings 53 permit the rotatable bearing element to have universal movement with respect to the shaft 23, and consequently the shaft may wobble without causing the rotating bearing element 54 to wobble. Hence, this element may run true with respect to the stationary bearing element 56. Thrust acting in the direction of the arrow in Fig. 8 will be transmitted to the bearing element 54 through the left hand Cardan ring, while thrust acting in the opposite direction will be transmitted through the right hand Cardan ring.

In Fig. 9 there is disclosed a bearing similar to that shown in Fig. 1, except that the Cardan rings, here designated by reference characters 60, are disposed between rotationally stationary thrust bearing elements 61 and the inner housing 21. The rotatable thrust bearing elements 62 are rigidly connected to the shaft 23. Consequently, wobbling of the shaft causes bearing element 62 to wobble, and, due to the fact that bearing elements 61 have universal movement with respect to the housing 21, they may wobble with the rotating elements. Therefore, there is no relative movement, other than rotational, between the cooperating bearing members. The bearing surfaces are of the same character as afore described.

In Figs. 10 through 13, there is shown a thrust bearing in combination with a radial bearing, the thrust bearing being provided with but a single Cardan ring. In this embodiment of my invention the radial bearing is the same as that described in connection with Fig. 1 and acts to carry the radially acting load on the shaft. The thrust bearing is located to one side of the radial bearing within the same housing 70. Rigidly secured to the shaft 23 by means of the pin 71 is a sleeve 72. Rigidly secured to sleeve 72 is a pair of axially spaced carrying rings 73 and 74. The inner radial face of ring 73 is provided with diametrically opposed recesses 75. Similar recesses 76 are provided in the inner radial face of ring 74. The Cardan ring 77 is provided with a pair of diametrically opposed axially extending projections 78 on one side of the ring for engaging recesses 75 and with a similar pair of projections 79 on the other side of the ring for engaging recesses 76. At 90° from the projections 78 and 79 the Cardan ring is provided with a pair of radially outwardly extending projections 80 which extend into an annular recess 81 formed in a rotatable bearing element 82. Annular recess 81 extends around the entire inner circumference of element 82, and, at diametrically opposed points, the element is formed with cut-away portions 83. In order to assemble the element on the Cardan ring two sections 84 of a locking ring are inserted into annular recess 81. These sections are of such length that they terminate adjacent to the cut-away portions 83. The projections 80 on the Cardan ring are then moved through the cut-away portions until they are within the annular recess, whereupon the Cardan ring is rotated approximately 90° with respect to the bearing element. This causes the locking ring sections 84 to be rotated so that a solid part of each ring is now aligned with the cut-away portions. The ring is then upset at this point so as to lock it securely in place.

Stationary annular thrust bearing elements 85 are supported in the housing 70 adjacent to the radial face of rotatable bearing element 82, and serve to receive the thrust load therefrom.

In the operation of this bearing, a thrust load acting in the direction of the arrow 86 will be transmitted from the sleeve 72 rigidly secured to the shaft to the ring 73 and through the projections 78 to the Cardan ring 77. From the Cardan ring the thrust load will be transmitted through the radial projections 80 to the rotatable bearing element 82 and thence to the right hand stationary bearing element 85. If the thrust acts in the opposite direction, it will be transmitted through the shaft to the ring 74 and through the projections 79 to the Cardan ring and thence through the projections 80 to the rotatable bearing element 82. If the shaft wobbles with respect to the housing, the Cardan ring pivots about the projections 78 or 79, depending upon the direction of the thrust, and about the projections 80. Consequently, the rotatable bearing element 82 has universal movement with respect to the shaft and therefore is not forced to wobble with the shaft, but will run true with respect to the stationary bearing elements.

The bearing element 82 is on its one side exposed to the pressure from the oil films being evenly distributed over the bearing surfaces. Towards the Cardan ring 77 it is, however, only supported on the two diametrically opposed projections 80. In order to prevent the element 82 from yielding under the pressure of the oil films I have found that it is to be made with a thickness in axial direction greater than the half of the radial extension of the bearing surfaces. In the embodiment according to Figs. 10-13 there is space enough in axial direction for dimensioning the rotating element 82 thick enough as the Cardan ring is positioned radially inside the same and as there is only one such element for taking up thrust in either direction.

In the lubrication of the thrust bearing shown particularly in Fig. 10, it is necessary to make provision for the removal of air from the annular chamber bounded by the bearing housing and stationary and rotating bearing members in order that lubricant may be freely circulated thereinto. To this end, channels 87 are formed in stationary bearing elements 85 and extend from the aforesaid annular chamber to the inner periphery of annular bearing elements 85. In order to assure adequate lubrication of the bearing, particularly in the upper part thereof which is above the level of the oil within the housing 70, the bearing surfaces of the rotatable bearing elements are provided with radially extending lubricant supply recesses 88, as is shown in Figs. 10 and 13. These recesses permit oil to be supplied to the outer periphery of the bearing by reason of centrifugal force. However, at high speeds it may happen that the centrifugal force throws all of the lubricant out from the bearing surfaces before it has a chance to be carried all the way around the bearing. This results in a portion of the bearing surfaces being without proper lubrication. To overcome this possibility, there is provided a series of pockets 89 formed in the locking ring sections 84. Radially extending passages 90 communicate with pockets 89 and with axially extending passages 91 which supply lubricant to the bearing surfaces. Pockets 89 are filled with lubricant when in the lower part of the bearing and centrifugal force causes this lubricant to flow therefrom through the passages 90 and 91 to the bearing surfaces as the element 82 rotates. The inner diameter of the ring sections 84 may be greater than the inner diameter of the rotating element 82 so as to form an annular recess in which on rotation an oil ring is set up for supplying still more oil to bearing surfaces through channels 90 and 91. The inner periphery of the annular stationary bearing elements 85 is formed as grooves 92 which serve to retain an annular ring of lubricant which is thrown thereinto by reason of centrifugal force from the beveled surfaces 93 of the rotating element 82. It will herefrom be evident that oil is supplied to the bearing surfaces even when they are above the oil level in the bottom of the bearing housing so as to assure a proper lubrication of all portions of the bearing surfaces.

As appears from Fig. 13, the radial recesses 88 are disposed between two adjacent surfaces of the wave-like bearing surface being in an inclined position to each other. Of two such surfaces the one is active for forming wedge-shaped load sustaining oil films against the flat bearing surface of the stationary members 85 in the one direction of rotation and the other for rotation in opposite direction. The depth $a$ (Fig. 13) of said inclined surfaces may be of the size of one or some hundreds of a millimeter and is determined in view of the load conditions.

The bearing described in Fig. 10, when made and assembled at the manufacturing plant, is preferably provided with undivided stationary bearing elements 85, rotational bearing elements 82 and Cardan ring 77. Should the bearing in use become damaged so that any of these members need to be replaced, this may be done without disassembling the whole bearing by cutting the worn member and replacing it by a split member, as is shown in Figs. 14 and 15. In these figures there is shown the joint of the rotary bearing element 82' when it is made in two parts. The two halves of the element are connected by means of a ring 94 which is placed in two semi-circular matching grooves 95 and 96 in the two halves of the member 82'. The inner diameter of the ring 94 is slightly less than that of the grooves 95 and 96, but the ring may be forced into the grooves and will thus tightly clamp the two halves of the element 82' together. The ring may be placed in the grooves while hot and shrunk into position. The two halves of the element 82' are offset as at 97 to insure proper alignment.

I am aware that it is known to construct a thrust bearing having stationary block shoes or segments being centrally supported, with a Cardan ring, and I therefore make no broad claim on such a ring.

While I have described several more or less specific embodiments of my invention, it is to be understood that these are for purpose of illustration only, and that the scope of my invention is to be limited only by the appended claims when viewed in the light of the prior art.

What I claim is:

1. In a thrust bearing for supporting a rotatable shaft member, a rotatable annular bearing element carried by said shaft member, a stationary member, a rotationally stationary annular bearing element carried by said stationary member, said annular bearing elements having cooperating bearing surfaces, and means between one of said annular bearing elements and the carrying member associated therewith for permitting universal movement therebetween, said means comprising a member pivoted with respect to the annular bearing element for movement about a first axis and pivoted with respect to the carrying member for movement about a second axis which is at right angles to said first axis, whereby said bearing surfaces may remain in proper cooperating relationship with each other irrespective of an oblique positioning of the shaft with respect to said stationary member.

2. In a thrust bearing for supporting a rotatable shaft member, a rotatable annular bearing element carried by said shaft member, a stationary member, a rotationally stationary annular bearing element carried by said stationary member, said annular bearing elements having cooperating bearing surfaces, and means between the first mentioned member and said rotatable annular bearing element for permitting universal movement therebetween, said means comprising a member pivoted with respect to said rotatable annular bearing element for movement about a first axis and pivoted with respect to said first mentioned member for movement about a second axis which is at right angles to said first axis, whereby said bearing surfaces may remain in proper cooperating relationship with each other irrespective of an oblique positioning of the shaft with respect to said stationary member.

3. In a thrust bearing for supporting a rotatable shaft member, a rotatable annular bearing element adapted to be fixed to said shaft member, a stationary member, a rotationally stationary annular bearing element carried by said stationary member, said bearing elements having cooperating bearing surfaces, one of which is wave-like and the other flat, and means between said stationary member and said rotationally stationary annular bearing element for permitting universal movement therebetween, said means comprising a member pivoted with respect to said rotationally stationary annular bearing element for movement about a first axis and pivoted with respect to said stationary member for movement about a second axis which is at right angles to said first axis, whereby said bearing surfaces may remain in proper cooperating relationship with each other irrespective of an oblique positioning of the shaft with respect to said stationary member.

4. In a thrust bearing, a rotary member, a rotatable annular bearing element carried on said member, a stationary member, a rotationally stationary annular bearing element carried by said stationary member, said annular bearing elements having cooperating bearing surfaces, one of which is wave-like, and a Cardan ring between one of said annular bearing elements and the carrying member associated therewith for permitting universal movement therebetween, whereby said bearing surfaces may remain in proper cooperating relationship with each other around the periphery of the said annular bearing element irrespective of an oblique positioning of the shaft with respect to said stationary member.

5. In a thrust bearing for supporting a rotatable shaft, a member adapted to be fixed to said shaft, a rotatable annular bearing element carried by said member, a stationary member, a rotationally stationary annular bearing element carried by said stationary member, said annular bearing elements having cooperating bearing surfaces, one of which is wave-like, and a Cardan ring between the first mentioned member and said rotatable annular bearing element for permitting universal movement therebetween, so as to distribute thrust substantially evenly between all wedge-shaped spaces formed by said wave-like bearing surface and active in either direction of rotation.

6. In a thrust bearing for supporting a rotatable shaft, a member adapted to be fixed to said shaft, a rotatable bearing ring carried by said member, a stationary member, a rotationally stationary bearing ring carried by said stationary member, said bearing rings having cooperating bearing surfaces, one of which is wave-like, and a Cardan ring between said stationary member and said rotationally stationary bearing ring for permitting universal movement therebetween, so as to distribute thrust substantially evenly between all wedge shaped spaces formed by said wave-like bearing surface and active in either direction of rotation.

7. In a thrust bearing for supporting a rotatable shaft, a member adapted to be fixed to said shaft, a rotatable bearing element carried by said member, a stationary bearing element positioned on either side of said rotatable bearing element, said bearing elements having cooperating bearing surfaces, and a Cardan ring for permitting universal movement between said first-mentioned member and said rotatable bearing element, whereby a bearing surface on said rotatable bearing element may remain in proper cooperating relationship with a bearing surface on one or the other of said stationary bearing elements irrespective of an oblique positioning of the shaft with respect to said stationary bearing elements.

8. A thrust bearing comprising a rotatable annular member, a rotationally stationary annular bearing member, said members having cooperating bearing surfaces, one of which is wave-like and the other flat, and a Cardan ring for supporting one of said bearing members so that load between said members is evenly distributed around the periphery of the bearing.

9. In a thrust bearing for supporting a rotatable shaft, a member adapted to be fixed to said shaft, a rotatable bearing element carried by said member, a stationary member, a rotationally stationary bearing element carried by said stationary member, said bearing elements having cooperating bearing surfaces, one of which is wave-like, and means for permitting universal movement between the first mentioned member and said rotatable bearing element, said means comprising a ring, a first pair of diametrically opposed projections on one side of said ring engaging recesses formed in said rotatable bearing element, and a second pair of diametrically opposed projections on the other side of said ring and angularly displaced ninety degrees from said first pair of projections and engaging recesses in said first mentioned member, whereby said bearing surfaces may remain in proper cooperating relationship with each other irrespective of an oblique positioning of the shaft with respect to said bearing member.

10. In a thrust bearing for supporting a rotatable shaft, a member adapted to be fixed to said shaft, a rotatable bearing element carried by said member, a stationary member, a rotationally stationary bearing element carried by said stationary member, said bearing elements having cooperating bearing surfaces, one of which is wave-like, means for permitting universal movement between said stationary member and said rotationally stationary bearing element, said means comprising a ring, a first pair of diametrically opposed projections on one side of said ring engaging recesses in said rotationally stationary bearing element, and a second pair of diametrically opposed projections on the other side of said ring and angularly displaced ninety degrees from said first pair of projections and engaging recesses in said stationary member, whereby said bearing surfaces may remain in proper cooperating relationship with each other irrespective of an oblique positioning of the shaft with respect to said stationary member.

11. In a combined thrust and radial bearing for supporting a rotatable shaft, inner radial bearing means adapted to be carried in rotation by the shaft, a rotationally stationary outer radial bearing member, said means and said member having cooperating spherical bearing surfaces whereby said means may have universal movement with respect to said member to allow for an oblique positioning of the shaft with respect to said member, a fixed member supporting said outer bearing member, a carrying member adapted to be fixed to said shaft adjacent to said inner bearing means, a rotatable thrust bearing element carried by said carrying member, a rotationally stationary thrust bearing element carried by said fixed member, said thrust bearing element having cooperating bearing surfaces, and a Cardan ring between one of said thrust bearing elements and the member carrying it for permitting universal movement therebetween, whereby the bearing surfaces of said thrust bearing elements may remain in proper cooperating relationship with each other irrespective of oblique positioning of the shaft with respect to said fixed member.

12. In a combined thrust and radial bearing for supporting a rotatable shaft, inner radial bearing means adapted to be carried in rotation by the shaft, a rotationally stationary outer radial bearing member, said means and said member having cooperating spherical bearing surfaces, whereby said means may have universal movement with respect to said member to allow for an oblique positioning of the shaft with respect to said member, a fixed member for supporting said outer bearing member, a carrying member adapted to be fixed to said shaft adjacent to said inner bearing means, a rotatable thrust bearing element carried by said carrying member, a rotationally stationary thrust bearing element carried by said fixed member, said thrust bearing elements having cooperating bearing surfaces, and a Cardan ring between said rotatable thrust bearing element and said carrying member for permitting universal movement therebetween, whereby the bearing surfaces of said thrust bearing elements may remain in proper cooperating relationship with each other irrespective of oblique positioning of the shaft with respect to said fixed member.

13. In a combined thrust and radial bearing for supporting a rotatable shaft, inner radial bearing means adapted to be carried in rotation by the shaft, a rotationally stationary outer radial bearing member, said means and said member having cooperating spherical bearing surfaces whereby said means may have universal movement with respect to said member to allow for an oblique positioning of the shaft with respect to said member, a fixed member for supporting said outer bearing member, a carrying member adapted to be fixed to said shaft adjacent to said inner bearing means, a rotatable thrust bearing element carried by said carrying member, a rotationally stationary thrust bearing element carried by said fixed member, said thrust bearing elements having cooperating bearing surfaces, and a Cardan ring between said rotationally stationary thrust bearing element and said fixed member for permitting universal movement therebetween, whereby the bearing surfaces of said thrust bearing elements may remain in proper cooperating relationship with each other irrespective of oblique positioning of the shaft with respect to said fixed member.

14. In a combined thrust and radial bearing for supporting a rotatable shaft, inner radial bearing means adapted to be carried in rotation by the shaft, a rotationally stationary outer radial bearing member, said means and said member having cooperating spherical bearing surfaces whereby said means may have universal movement with respect to said member to allow for an oblique positioning of the shaft with respect to said member, a fixed member for supporting said outer bearing member, carrying members adapted to be fixed to the shaft on either side of said inner bearing means, rotatable thrust bearing elements carried by said carrying members and having bearing surfaces, a stationary thrust bearing element adjacent to each of said rotatable elements and secured to said fixed member, each of said stationary elements having bearing surfaces for cooperating with the bearing surface on the adjacent rotatable element to transmit thrust in either direction, and a Cardan ring between each of said carrying members and rotatable elements for permitting universal movement therebetween, whereby the bearing surfaces of said elements may remain in proper cooperating relationship with each other irrespective of oblique positioning of the shaft with respect to said fixed member.

15. In a combined thrust and radial bearing for supporting a rotatable shaft, inner radial bearing means adapted to be carried in rotation by the shaft, a rotationally stationary outer radial bearing member, said means and said member having cooperating spherical bearing surfaces whereby said means may have universal movement with respect to said member to allow for an oblique positioning of the shaft with respect to said member, a fixed member for supporting said outer bearing member, carrying members adapted to be fixed to the shaft on either side of said inner bearing means, rotatable thrust bearing elements carried by said carrying members and having bearing surfaces, a rotationally stationary thrust bearing element adjacent to each of said rotatable elements and carried by said fixed member, each of said stationary elements having a bearing surface for cooperating with the bearing surface on the adjacent rotatable element to transmit thrust in either direction, and a Cardan ring between each of said rotationally stationary elements and said fixed member for permitting universal movement therebetween, whereby the bearing surfaces of said elements may remain in proper cooperating relationship with each other irrespective of oblique positioning of the shaft with respect to said fixed member.

16. In a thrust bearing for supporting a rotatable shaft, a bearing housing forming a lubricant reservoir, a pair of axially spaced stationary annular bearing elements fixed in said housing and having bearing surfaces facing each other, an annular rotatable bearing element adapted to be secured to the shaft and positioned between said stationary elements and having bearing surfaces on opposite faces for cooperating with the respective bearing surfaces on said stationary elements, the bearing surfaces on said rotatable element being provided with radially extending lubricant supply recesses, means for supplying lubricant to the radially inner ends of said recesses, said stationary and rotatable bearing elements and said housing forming an annular chamber, and said stationary annular bearing elements being formed with channels for establishing communication between said annular chamber and the central opening in said stationary annular bearing elements.

17. In a thrust bearing for supporting a rotatable shaft, a bearing housing forming a lubricant reservoir, a pair of axially spaced stationary annular bearing elements fixed in said housing and having bearing surfaces facing each other, an annular rotatable bearing element adapted to be secured to the shaft and positioned between said stationary elements and having bearing surfaces on opposite faces for cooperating with the respective bearing surfaces on said stationary elements, the bearing surfaces on said rotatable element being provided with radially extending lubricant supply recesses, said stationary and rotatable bearing elements and said housing forming an annular chamber, the inner peripheries of said annular stationary elements being formed as grooves and the inner periphery of said annular rotatable element being beveled so that lubricant will be thrown therefrom by centrifugal force into said grooves, and said stationary elements being formed with channels for establishing communication between said annular chamber and said grooves.

18. In a thrust bearing for supporting a rotatable shaft, a bearing housing forming a lubricant reservoir, a pair of axially spaced stationary annular bearing elements fixed in said housing and having bearing surfaces facing each other, an annular rotatable bearing element adapted to be secured to the shaft and positioned between said stationary elements and having bearing surfaces on opposite faces for cooperating with the respective bearing surfaces on said stationary elements, the bearing surfaces on said rotatable element being provided with radially extending lubricant supply recesses, said stationary and rotatable bearing elements and said housing forming an annular chamber, the inner peripheries of said annular stationary elements being formed as grooves and the inner periphery of said annular rotatable element being beveled so that lubricant will be thrown therefrom by centrifugal force into said grooves, said stationary elements being formed with channels for establishing communication between said annular chamber and said grooves, and said annular rotatable element being formed with axially extending passages connecting said recesses in opposite bearing surfaces and formed with radially extending passages connecting said axial passages with pockets formed in the rotatable annular element at the inner periphery thereof.

19. In a thrust bearing, a bearing housing forming an oil reservoir, a rotating annular member, a rotationally stationary annular member, said members having cooperating annular bearing surfaces, one of which is wave-like, and means to supply oil to the radially inner circumferences of said annular bearing surfaces when they are during rotation above the oil level in said reservoir.

20. In a thrust bearing, a bearing housing forming an oil reservoir, a rotary annular member, a stationary annular member, said members having cooperating bearing surfaces, one of said surfaces being wave-like and provided with radially extending oil supply recesses, and means to supply oil to the radially inner ends of said recesses for lubricating said bearing surfaces when they are during rotation above the oil level in said reservoir.

21. In a thrust bearing, a bearing housing forming an oil reservoir, a rotary annular member, a stationary annular member, said members having cooperating bearing surfaces, the rotating bearing surface having radially extending oil supply recesses, and means to supply oil to the radially inner ends of said recesses for lubricating said bearing surfaces when they are during rotation above the oil level in said reservoir.

22. In a thrust bearing, a bearing housing forming an oil reservoir, a rotary annular member, a stationary annular member, said members having cooperating annular bearing surfaces, one of said surfaces being wave-like, means to supply oil to the radially inner circumferences of said annular bearing surfaces when they are during rotation above the oil level in said reservoir, and a Cardan ring for supporting one of said bearing members so that thrust is evenly distributed around the periphery of said annular bearing surfaces.

23. In a thrust bearing, a bearing element, a bearing member positioned on either side of said bearing element, said element on the one hand and said two members on the other hand being relatively movable and having cooperating bearing surfaces, one of each pair of said bearing surfaces being wave-like, and a common Cardan ring for permitting universal movement between said element and said members so as to distribute thrust acting in either direction of the shaft substantially evenly around the periphery of the bearing.

24. In a bearing for a substantially horizontal shaft, a stationary bearing member, a rotatable bearing member, said members having cooperating bearing surfaces, and a housing around said bearing members forming a lubricant reservoir, said rotatable member being formed with a recess and a conduit connecting said recess with said bearing surfaces, said recess upon rotation of said rotatable member being adapted to dip beneath the surface of the lubricant in said reservoir and to distribute said lubricant under the influence of centrifugal force through said conduit to said bearing surfaces.

25. In a bearing for a substantially horizontal shaft, a stationary bearing member, a rotatable bearing member, said members having cooperating bearing surfaces, and a housing around said bearing members forming a lubricant reservoir, said rotatable member being formed with open recesses and conduits connecting said recesses with said bearing surfaces, said recesses upon rotation of said rotatable member being adapted to dip beneath the surface of the lubricant in said reservoir to receive lubricant and to distribute it under the influence of centrifugal force through said conduits to said bearing surfaces.

26. In a bearing for a substantially horizontal shaft, a stationary bearing member, an annular rotatable bearing member, said members having cooperating bearing surfaces, and a housing around said bearing members forming a lubricant reservoir, said rotatable member being formed with open recesses in the inner annular surface thereof and with conduits connecting said recesses with said bearing surfaces, said recesses upon rotation of said rotatable member being adapted to dip beneath the surface of the lubricant in said reservoir to receive lubricant and to distribute it under the influence of centrifugal force through said conduits to said bearing surfaces.

27. In a bearing for a substantially horizontal shaft, a stationary bearing member, an annular rotatable bearing member, said members having cooperating bearing surfaces, and a housing around said bearing members forming a lubricant reservoir, said rotatable member being formed with an open annular recess in the inner annular surface thereof and with conduits connecting said recess with said bearing surfaces, said recess being adapted to dip beneath the surface of the lubricant in said reservoir to receive lubricant and upon rotation of said rotatable member to distribute the lubricant under the influence of centrifugal force to said bearing surfaces.

28. In a thrust bearing, a stationary bearing member, a rotatable bearing member axially disposed with respect to said stationary member, said members having cooperating bearing surfaces, and a housing around said bearing members forming a lubricant reservoir, said rotatable member being formed with a recess and conduits connecting said recess with said bearing surfaces, said recess upon rotation of said rotatable member being adapted to receive lubricant from said reservoir and to distribute it under the influence of centrifugal force through said conduits to said bearing surfaces, said stationary and rotatable bearing members and said housing forming an annular chamber and said stationary bearing member being formed with a channel connecting said annular chamber with the central part of said housing.

29. In a thrust bearing, an annular stationary bearing member, an annular rotatable bearing member axially disposed with respect to said stationary member, said members having cooperating bearing surfaces, and a housing around said bearing members forming a lubricant reservoir, said rotatable member being formed with a recess and conduits connecting said recess with said bearing surfaces, said recess upon rotation of said rotatable member being adapted to receive lubricant from said reservoir and to distribute it under the influence of centrifugal force through said conduits to said bearing surfaces, the inner periphery of said annular stationary member being formed as a groove and the inner periphery of said annular rotatable member being beveled so that lubricant will be thrown therefrom by centrifugal force into said groove.

30. In a thrust bearing, a stationary bearing member, a rotatable bearing member, said members having cooperating bearing surfaces and the surface of said rotatable member being formed with radially extending grooves, and a housing around said bearing members forming a lubricant reservoir, said rotatable member being formed with a recess and conduits connecting said recess with said grooves, said recess being adapted to dip beneath the surface of the lubricant in said reservoir to receive lubricant and to distribute it under the influence of centrifugal force through said conduits to said grooves.

31. A thrust bearing including rotatable means having an annular bearing surface, rotationally stationary means having an annular bearing surface cooperating with the first mentioned surface, and a Cardan ring for supporting one of said means so that load between said means is evenly distributed around the periphery of the bearing, said Cardan ring being disposed within the inner radial limits of said annular bearing surfaces.

AUGUST GUNNAR FERDINAND WALLGREN.